3,046,147
WATER SOLUBLE MOLD AND CORE
BINDERS AND METHOD
Clayton E. Hathaway, Jr., Donald C. Goetz, and Roger H. Kottke, Minneapolis, Minn., assignors to Archer-Daniels-Midland Company, Minneapolis, Minn., a corporation of Delaware
No Drawing. Filed Aug. 12, 1959, Ser. No. 833,133
3 Claims. (Cl. 106—38.9)

This invention relates to providing an improvement in water soluble and resoluble high solids content binder in making mold and core forms utilized in metal and plastic castings, or the preparation of improved binders and aggregate for mold and core forms and the products obtained thereby. More particularly the invention relates to an improvement in providing a water soluble complex of borax-phosphate bonded sand, silica, ceramic and other aggregate or investment, mold and core materials for the casting of hot metal and plastic objects under heated conditions.

At the present time there are utilized several organic and inorganic binding materials for bonding the aggregate of core and mold forms. Of the organic type are the oils and resins which are not water soluble after curing and setting, and under conditions of heat. Such binders, as usually encountered in melting and casting operations, are gas forming. Of the inorganic type, the silicates, such as sodium silicate or hydrolyzed ethyl silicate, Portland cement and plaster of Paris are widely used. In addition to these, there has also been utilized phosphoric acid or phosphate salts which usually liberate undesirable amounts of reactant phosphoric acid when heated. Otherwise, the art has not found that the metal oxides, metal hydroxides, carbonates and the like have heretofore provided readily resoluble mold form binders. While inorganic binders are generally not gas producing, after heat curing, certain other difficulties occur in the use of such binders. Removal of the mold forming material and particularly from small cores of cast metal or plastic article is sometimes extremely difficult, if not impossible with retention of the molded piece, as formed. The art has provided for a combination of a phosphate and clay. The clay may be present in the sand or otherwise must be added. This clay material usually contains reactant metal silicates. The problem has been to provide more suitable and readily water soluble binder material for permitting ready removal of the aggregate or investment materials, forming the plastic and light metal mold and core forms, after heating. Particularly, the difficulty has been in making delicate and fine tubular passageways from which the molding form is readily resoluble in water after casting under heated conditions.

Accordingly, it is an object of this invention to provide core and mold form binders of readily water soluble inorganic complexes of borax-phosphate salts which cure simply by evaporation of water, bake rapidly at suitable temperatures to give a strong aggregate bond that produces no detrimental gas fumes during either the curing or the casting steps and are readily water soluble after use.

Another object of this invention is to provide improved readily water soluble inorganic mold and core binders of borax-phosphate complexes for bonding mold and core forms in making metal and plastic castings, which form when used at elevated temperature are still readily water soluble and provide for easy separation of the mold form from the casting.

An essential objective of this improvement is to provide mold and core forms of aggregate material binding with a stable bonding agent which is inert up to temperatures of about 1500° F. during solidification of a cast plastic or metal article and retains ready water resolubility for removal of the aggregate from fine and small cast or molded articles.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed in the metal foundry and plastic molding and casting art.

The provision of an aggregate or investment material, for example sand or other mold and core form material, is provided by mixing therewith a binder which sets up the aggregate material in the desired mold form. Inasmuch as the bonding material herein described is to be utilized in the manner of other mold and core binders and the details of making up such aggregate and binder materials are well known to the art of foundry and plastic molding, many of the conventionally known details are not recited herein.

However, the plastic molding and casting art has not been able to use the presently known binders for producing cored passageways, and particularly fine or pencil like tubular structure, prepared from such materials as "Epon" resins, polyesters, acrylic, phenolics, and the like, particularly utilizing resins which do not properly cure at room temperatures. Illustratively, for example, styrene or urea and melamine, and other well known molding resins of this character.

The herein described preferred binder material, utilized to bond the aggregate material forming the core or mold form, is a solution of borax and monobasic sodium phosphate in water. The borax may be present in proportion of from about 40 to about 300 parts by weight to about 100 parts by weight of the phosphate. In preparing the binder composition sufficient water is added to give a nonvolatile portion of from about 40 to 75%. This solution is then mixed, for example, with the aggregate material in a sufficient proportion to thoroughly wet the particle surfaces when thoroughly mixed therewith. Upon forming the mold form of the wetted aggregate material, curing of the binder is brought about by the evaporation of water. This evaporation is preferably accomplished by heat, such as baking in an oven, with infrared heaters, or in a dielectric oven or other suitable heating means. Curing temperature may be from about 220° F. (just above the boiling point of water) to 350° F. or higher.

More specifically, a preferred binder consists of a mixture of about 248 parts by weight of borax with about 100 parts by weight of the phosphate. This mixture can be prepared in dry form, by compounding a solution and evaporating the water by spray drying, drum drying or other methods well known in the art, and crushing the preformed solids. Such a material is resoluble in water and the composition can be utilized by merely adding water in an amount at least sufficient to resolubilize the dry powder material. Usually, the ratio of the powder material to water is in the proportion of about 50%. The preferred composite binders and preparations are exemplified, as follows:

*Example I*

To a flask provided with a reflux condenser, a stirrer and electrical heater and a thermometer was charged 1070 parts by weight of water. A mixture of 3000 parts by weight granular borax ($Na_2B_4O_7 \cdot 10H_2O$) and 1220 parts by weight monobasic sodium phosphate monohydrate ($NaH_2PO_4 \cdot H_2O$) was slowly added while the material in the flask was being heated and stirred. After all the dry ingredients had been added the temperature of the batch was raised until refluxing began and the reaction was held at this temperature until all the solid material had dissolved. Thirty parts by weight of "Hyflo" filter aid, a diatomaceous earth, was added and the product was filtered. The finished binder was a viscous water-white liquid.

*Example II*

Following the procedure of Example I a binder with a higher solids content was prepared from 3000 parts by weight of borax, 1220 parts by weight of monobasic sodium phosphate monohydrate and 300 parts by weight of water. This material was an extremely viscous liquid.

*Example III*

A binder utilizing a higher ratio of borax to phosphate was prepared according to the method of Example I. To 2675 parts by weight of water were added a mixture of 3000 parts by weight of borax and 1000 parts by weight of monobasic sodium phosphate monohydrate. The resultant product was a water-white liquid.

*Example IV*

A binder utilizing a lower ratio of borax to phosphate was prepared according to the method of Example I. To 7440 parts by weight of water was added a mixture of 3000 parts by weight of borax and 7440 parts by weight of monobasic sodium phosphate monohydrate. This product was likewise a water-white liquid.

*Example V*

The composite binder of Example II was dried on a double drum drier at a drum temperature of 275° F. The product was a fluffy white powder easily resoluble in water. Similarly, the other binders may be dried and utilized as resoluble binders for the aggregates forming the mold and core forms.

*Example VI*

A core forming composition was prepared from 100 parts by weight of silica sand (AFS fineness 65) and 4 parts by weight of the binder of Example I. The binder was added to the sand which was in a Simpson Laboratory Muller and mixing was continued for four minutes, at which time the liquid binder was evenly dispersed throughout the sand mass. The sand mix was rammed into a tensile briquette pattern and the resulting specimens were baked at 350° F. After cooling the tensile briquettes were hard and rigid. The briquettes were then broken in a Universal Tensile Testing Machine. The tensile strengths for various baking times are shown in the accompanying table along with the results obtained from the binders of Examples II–V.

| Binder | Bake Time | | | |
|---|---|---|---|---|
| | 15 min. | 30 min. | 45 min. | 60 min. |
| I | 274 | 264 | 257 | 262. |
| II | 274 | 262 | 250 | 258. |
| III | Comparable | 229 | Comparable | Comparable. |
| IV | ----do---- | 188 | ----do---- | Do. |
| V | ----do---- | 208 | ----do---- | Do. |

These tensile strengths are more than adequate for foundry use. Several core specimens were heated to 1500° F. and after cooling were still readily resoluble in water.

In actual practice the sand-binder mix can be packed into a core box or pattern either by hand or with a machine such as a core blower or core shooter, both of which are well known in the art. The mold or core can be cured in the form in which it was prepared or alternately the shaped form may be removed and allowed to stand on a plate or a contoured drier plate during the curing process.

*Example VII*

To illustrate the applications of this material in the foundry art, a core shape was prepared, from a mixture of 100 parts of conventional silica sand core forming material and 4 parts of the binder of Example I, and baked at 350° F. After cooling it was placed in a mold. An aluminum alloy at 1350° F. was poured into the mold without producing obnoxious fumes or odors and the very litle to no gas produced caused no damage to the metal surrounding small diameter passageways. In addition, this high temperature did not affect the water solubility of the binder as it was easily removed by immersing the cooled casting in water.

*Example VIII*

A core shape was fabricated from a mixture of 100 parts by weight of fine silica sand and 6 parts by weight of the binder of Example I. It was baked at 300° F. for 45 minutes, allowed to cool and placed in a mold. There was no obnoxious odor produced during the curing of the binder. The mold was filled with a casting resin prepared from: 100 parts "Epon" 828 (bis-phenol epichlorohydrin resin) mixed with 1 part dimethyl di-hydrogenated tallow ammonium chloride
35 parts hexahydrophthalic acid
35 parts monochlorophthalic acid.

The resin was poured into the mold and was cured by heating to 250° F. for 18 hours. The core was easily removed by soaking the casting in water for several minutes.

*Example IX*

A core shape was prepared according to the procedure of Example VI. A conventional phenolic resin casting syrup was used. The resin was poured into the mold and cured for 72 hours at 180° F. The core was easily removed by simply immersing and soaking the casting in water for several minutes.

As indicated above, the monobasic sodium phosphate is preferred. However, the other and less preferred secondary and tertiary sodium phosphates as well as sodium polyphosphates or any of the similar group of potassium phosphates may be utilized in combination with borax, as described. These combinations are particularly suitable for binding aggregate and investment materials utilized in casting light metal and plastic objects in prefabricated form with fine and pencil-like tubular passageways and thin membranes. The complex borax-alkali phosphate core binder retains its ready water solubility even up to temperatures of 1500° F., which permits ready removal of the core from a molded or cast object without damage to the molding or casting.

It is apparent that some modifications and variations of this invention as herein before set forth may be made without departing from the spirit and scope thereof. The specific embodiments described are given by way of example only.

We claim:

1. A molding form comprising an aggregate and a binder, said molding form being particularly useful in casting objects having fine tubular passageways, said molding form being stable to casting temperatures up to about 1500° F. and producing no detrimental gas fumes during casting, said molding form being readily removable from such passageways by merely immersing the casting in water and thereby dissolving the binder; said binder consisting essentially of 40 to 300 parts by weight of borax and 100 to 744 parts by weight of an alkali metal phosphate.

2. The invention defined in claim 1, wherein there are 300 parts by weight of borax and 100 to 122 parts by weight of monobasic sodium phosphate monohydrate in the binder.

3. The method of making a molding shape comprising mixing with a granular aggregate material a water solution of about 40 to 300 parts by weight of borax and about 100 parts by weight of an alkali metal phosphate so that all the surfaces of the granular aggregate are wetted and coated with said solution; forming a molding shape of the wetted aggregate; and heating the molding shape sufficiently to drive off the water and cure the borax-phosphate binder.

References Cited in the file of this patent

UNITED STATES PATENTS

| | | |
|---|---|---|
| 1,751,482 | Leasman | Mar. 25, 1930 |
| 2,618,530 | Gardner | Nov. 18, 1952 |
| 2,696,479 | Ossenbruggen et al. | Dec. 7, 1954 |

FOREIGN PATENTS

| | | |
|---|---|---|
| 74 | Great Britain | 1906 |
| 560,818 | Canada | July 22, 1958 |